United States Patent
Watanabe

[19]

[11] Patent Number: 6,067,626

[45] Date of Patent: May 23, 2000

[54] METHOD OF PROCESSING EXTERNALLY SUPPLIED DATA BY CPU IN NON-OPERATING STATE AND PORTABLE TERMINAL DEVICE FOR THE SAME

[75] Inventor: Mitsuhiro Watanabe, Tokyo, Japan

[73] Assignee: NEC Corporation, Tokyo, Japan

[21] Appl. No.: 08/946,995

[22] Filed: Oct. 8, 1997

[30] Foreign Application Priority Data

Oct. 17, 1996 [JP] Japan .................................. 8-274511

[51] Int. Cl.⁷ ...................................................... G06F 1/26
[52] U.S. Cl. .......................... 713/310; 713/323; 713/324
[58] Field of Search .................................. 713/310, 323, 713/324

[56] References Cited

U.S. PATENT DOCUMENTS

| | | | |
|---|---|---|---|
| 5,406,064 | 4/1995 | Takahashi | 235/492 |
| 5,692,197 | 11/1997 | Narad et al. | 713/310 |
| 5,692,203 | 11/1997 | Grodevant | 713/310 |
| 5,721,937 | 2/1998 | Kurihara et al. | 713/310 |
| 5,802,305 | 9/1998 | McKaughan et al. | 713/310 |

FOREIGN PATENT DOCUMENTS

| | | |
|---|---|---|
| 63-246935 | 10/1988 | Japan . |
| 2-244312 | 9/1990 | Japan . |
| 3-83436 | 4/1991 | Japan . |
| 4-325842 | 11/1992 | Japan . |
| 7-154506 | 6/1995 | Japan . |
| 7-203065 | 8/1995 | Japan . |

OTHER PUBLICATIONS

Japanese Office Action issued in a related application along with an English–language translation of the relevant portions.

"Transistor Technique", published by CQ Shuppan, Mar. 1994, pp. 208–237, In Japanese.

*Primary Examiner*—Glenn A. Auve
*Attorney, Agent, or Firm*—Ostrolenk, Faber, Gerb & Soffen, LLP

[57] ABSTRACT

A portable terminal device includes an information processing unit having a CPU which is a non-operating state, and an interface unit. When a data informing transmission of valid data is received from an external unit, the interface unit requests the external unit to stop the transmission of the valid data. At the same time, the interface unit transmits serial dummy data to the information processing unit. When the CPU is switched from a non-operating state to an operating state in response to reception of the serial dummy data, the interface unit requests the external unit to restart the transmission of the valid data. The interface unit transmits the valid data the information processing unit in serial. The CPU processes the valid data.

42 Claims, 7 Drawing Sheets

METHOD OF PROCESSING EXTERNALLY SUPPLIED DATA BY CPU IN NON-OPERATING STATE AND PORTABLE TERMINAL DEVICE FOR THE SAME

BACKGROUND OF THE INVENTION

1. Field of the Invention

The present invention relates to a method of processing data in a portable terminal device, and more particularly to a method of processing externally supplied data by a CPU in a non-operating state and a portable terminal device for the same.

2. Description of the Related Art

In the field of portable terminal device, a portable wireless terminal device using a wireless signal as the medium of data communication is conventionally known. In the conventional example, the internal structure of the portable wireless terminal device is divided into an information processing unit and a wireless interface unit which are respectively controlled by different CPUs. In this case, the CPU in the information processing unit is in a non-operating state from an energy saving viewpoint. That is, the supply of power to the CPU or the supply of a clock signal to the CPU is stopped. For this reason, the CPU is in the non-operating state. When a wireless signal is received by the wireless interface unit in a reception waiting state, a signal receiving process is performed. In this case, since it is necessary to start the CPU in the information processing unit during the signal receiving process, the CPU in the information processing unit is switched from the non-operating state to an operating state.

As a method of switching the CPU from the non-operating state to the operating state, the following methods are known.

1) An interrupt system:

This method is most general. In the method, only a signal detecting circuit on a controlled side is set to the operating state, and when a signal from a controlling side is detected, an interrupt signal is issued to the signal detecting circuit. Then, a main power supply is turned on and the CPU is set in the operating state.

2) A direct memory access (DMA) transfer system:

This method is described in, for example, Japanese Laid Open Patent Disclosure (JP-A-Heisei 2-244312). Serial communication data is transferred to a memory on a controlled side by direct memory access without passing through a CPU in the non-operating state on the controlled side.

3) A coil transfer system:

This method is described in, for example, Japanese Laid Open Patent Disclosure (JP-A-Showa 63-246935). A sync signal receiving coil is provided on a controlled side to receive a sync signal used to perform a serial communication. The sync signal of the serial communication data is received from a controlling side through the sync signal receiving coil, and the data communication is performed in synchronous with the received sync signal.

4) A command transfer system:

This method is described in, for example, in Japanese Laid Open Patent Disclosure (JP-A-Heisei 4-325842). A power supply controlling side issues an turn-on command for turning on a main power supply through serial data communication paths of a LAN and so on. Each of controlled sides receives and interprets this command by a serial data receiving unit and controls a main power supply via a power supply control unit. Thus, all the main power supplies of remote communication apparatuses on a controlled side are collectively turned on.

In addition to the above conventional example, various types of techniques of data transfer are described in a magazine "Transistor Technique" (1994, March) published from CQ Shuppan. In the described techniques, however, the circuit structure requires an expensive part or becomes more complicated for communication between the information processing unit and the wireless interface unit.

In the interrupt system of the above-mentioned conventional systems, the interrupt signal is issued to the CPU on the controlled side such that a main power supply is turned on. For this reason, there is the following problem. That is, even if data is sent from the wireless interface unit to the information processing unit, there is a case that the data cannot be correctly received depending on the timing when the CPU in the information processing unit is switched from the non-operating state to the operating state.

In the DMA transfer system, it is necessary that the serial communication unit and the reception memory are always in the operating state to allow the serial communication unit to receive the serial data through the DMA transfer. Also, a clock signal is required to be supplied to the serial communication unit. Therefore, there is a problem in power saving.

In the coil transfer system, in order to start the CPU in response to the reception of the sync signal by the coil such that the serial communication is performed, it is necessary to prepare the structurally large-scaled coil which can flow current sufficient to start the receiving circuit. For this reason, this coil transfer system is not suitable for the portable wireless terminal equipment which requires a compact size.

In the command transfer system, the power supply control unit is turned on at least to control the main power supply on the controlled side. As such, the power saving is not considered in the section. This is the most important problem in the portable terminal device driven with a cell.

SUMMARY OF THE INVENTION

A present invention is accomplished in view of the above circumstances. In accordance with, an object of the present invention is to provide a portable wireless terminal device in which an information processing unit is changed from a rest state to an operating state using the above interrupt system such that a command and/or data can be correctly received from a wireless interface unit.

In order to achieve an aspect of the present invention, a portable terminal device includes an information processing unit including a CPU which is in a non-operating state, and an interface unit for transmitting dummy data to the information processing unit to switch the information processing unit CPU from the non-operating state to an operating state and transmitting a received valid data to the information processing unit when the information processing unit CPU is in the operating state.

The dummy data is serial data and is data which is composed of a plurality of data pieces having a same bit pattern. That is, the dummy data is repeated until the information processing unit CPU is switched to the operating state.

The interface unit transmits the valid data to the information processing unit after a predetermined time period from when the dummy data is transmitted to the information processing unit. In this case, the predetermined time period is longer than a time period from when the dummy data is transmitted to the information processing unit to when the information processing unit CPU is switched to the operating state. The interface unit stops the transmission of the dummy data to the information processing unit after the predetermined time period from when the dummy data is transmitted to the information processing unit.

The interface unit requests an external unit to stop transmission of the valid data to the interface unit when the interface unit receives a data informing the transmission of the valid data to the interface unit. Also, the interface unit transmits the dummy data to the information processing unit in response to the reception of the informing data. Further, the interface unit requests the external unit to restart the transmission of the valid data to the interface unit after the predetermined time period from when the dummy data is transmitted to the information processing unit.

When the information processing unit generates a reply when the dummy data is received, the interface unit transmits the valid data to the information processing unit in response to the reply from the information processing unit. In this case, the interface unit stops the transmission of the dummy data to the information processing unit in response to the reply from the information processing unit. Also, the interface unit requests an external unit to stop transmission of the valid data to the interface unit when the interface unit receives a data informing the transmission of the valid data to the interface unit. The dummy data is transmitted to the information processing unit in response to the reception of the informing data. At this time, the interface unit requests the external unit to restart the transmission of the valid data to the interface unit in response to the reply from the information processing unit.

The interface unit transmits the dummy data to the information processing unit via a first serial line. Also, the information processing unit transmits the reply to the interface unit via a second serial line. Further, the interface unit transmits the valid data to the information processing unit via a third serial line.

In order to achieve another aspect of the present invention, in a portable terminal device comprising an information processing unit including a CPU which is in a non-operating state, and an interface unit which receives valid data from an external unit, a method of processing the valid data by the CPU, includes the steps:

receiving a data informing transmission of the valid data from an external unit to the interface unit;

transmitting a serial dummy data from the interface unit to the information processing unit in response to the informing data;

switching the CPU from the non-operating state to an operating state in response to reception of the serial dummy data;

transmitting the valid data from the interface unit to the information processing unit in serial when the information processing unit CPU is in the operating state; and processing the valid data by the CPU.

DETAILED DESCRIPTION OF THE PREFERRED EMBODIMENTS

Next, a portable terminal device of the present invention will be described below in detail with reference to the accompanying drawings, taking as an example a portable wireless terminal device.

Figure 1:
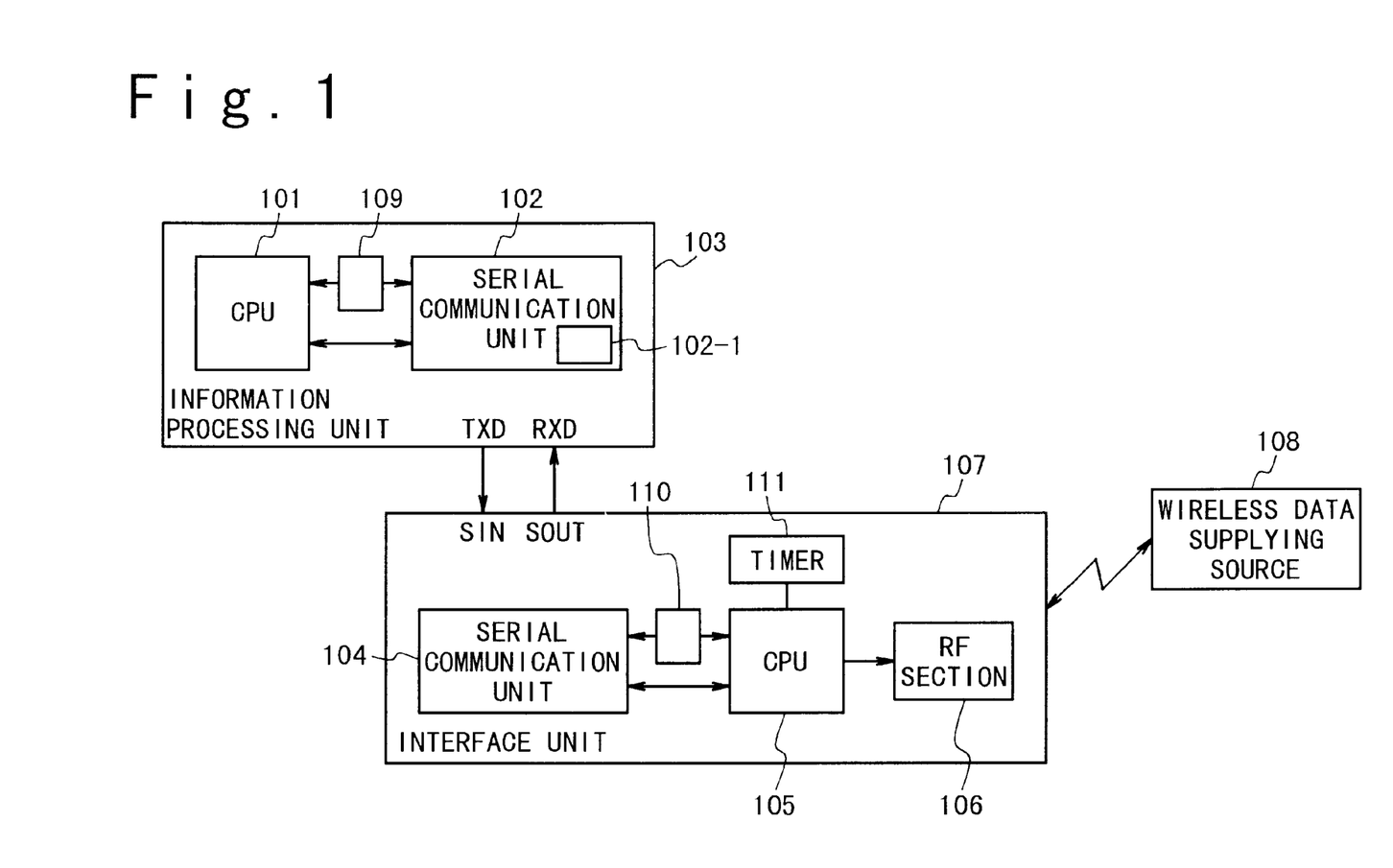
FIG. 1 is a system block diagram illustrating the structure of a portable wireless terminal device according to a first embodiment of the present invention.

FIG. 1 is a system block diagram illustrating the structure of the portable wireless terminal device according to the first embodiment of the present invention. Referring to FIG. 1, the portable wireless terminal device in the first embodiment is composed of an information processing unit 103 and a wireless interface unit 107. The wireless interface unit 107 and the information processing unit 103 are connected by a serial data transmission line via terminals TXD and SIN and a serial data reception line via terminals SOUT and RXD, and perform serial communication using these lines. These serial data transmission and reception lines may be wire paths or wireless paths if these two paths can be separated. However, in case of the wireless paths, it is necessary to realize a function to select a specific frequency and a function to amplify a signal. Therefore, the wire paths are suitable from the viewpoint of low power consumption and the compact size of the portable terminal device.

The information processing unit 103 is composed of a CPU 101, a serial communication unit 102 and a CPU driving circuit 109. The CPU 101 stores received data in a memory (not shown), reads data from the memory and processes data. The CPU 101 is normally in a non-operating state. The serial communication unit 102 includes a receiving section 102-1. The receiving section 102-1 is always in an operating state. When receiving a dummy data, the receiving section 102-1 switches the whole serial communication unit 102 to the operating state and drives the CPU driving circuit 109. The CPU driving circuit 109 stops the supply of power to the CPU 101 or the supply of a clock signal to the CPU 101. The CPU driving circuit 109 is driven by the serial communication unit 102 to restart the supply of power to the CPU 101 or the supply of a clock signal to the CPU 101. As a result, the CPU 101 is switched to the operating state by the CPU driving circuit 109.

The wireless interface unit 107 is composed of a serial communication unit 104, a wireless interface unit CPU 105, a timer section 111, a radio frequency transceiver/receiver section (to be referred to as a "RF section", hereinafter) 106, and a power supply control circuit 110. The RF section 106 communicates with a wireless data supplying source 108 by a wireless signal. The serial communication unit 104 is always in the non-operating state. The CPU 105 drives the power supply control circuit 110 to set the serial communication unit 110 in the operating state.

Figure 2:
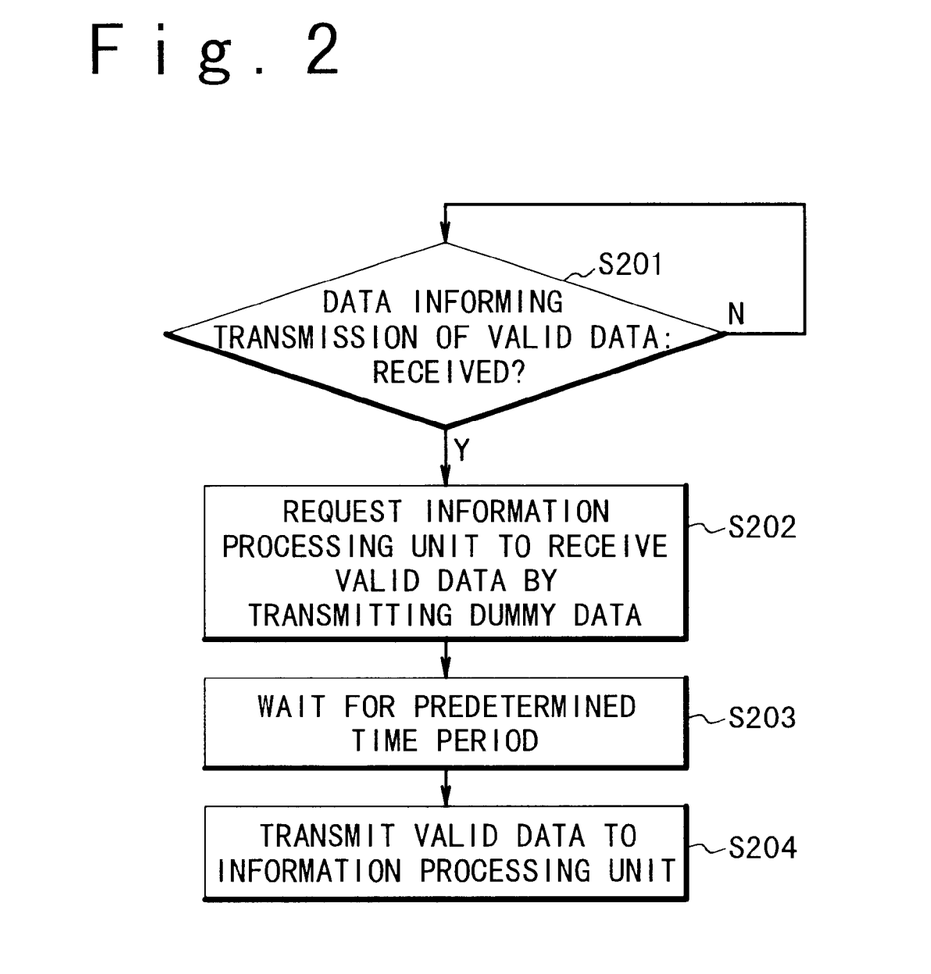
FIG. 2 is a flow chart to explain the operation of the portable wireless terminal device in the first embodiment.

Next, the operation of the portable wireless terminal device will be described with reference to FIG. 2. FIG. 2 shows a flow chart to explain the operation of the portable wireless terminal device. In this case, in the serial communication unit 102 of the information processing unit 103, a section other than the receiving section 102-1, which is to receive a signal from the serial communication unit 104, is in the non-operating state. The information processing unit CPU 101 is also in the non-operating state. In wireless interface unit 107, the RF section 106 and the wireless interface unit CPU 105 are in a wireless data wait state. The serial communication unit 104 is in the non-operating state.

Also, considering that the portable wireless terminal device is connected to a wireless network, the wireless data supplying source 108 is, for example, a network server. That is, the wireless data supplying source 108 irregularly transmits wireless data signals, such as E-mail accumulated therein, to the portable wireless terminal device through a wireless path.

In a step S201, the wireless interface unit 107 is in the data wait state. When an informing data transmission of valid data is received by the RF section 106, the CPU 105 of the wireless interface unit 107 checks whether the informing data received by the RF section 106 is transmitted from the wireless data supplying source 108. Subsequently, when it is determined that the informing data is transmitted from the wireless data supplying source 108, the wireless interface unit CPU 105 checks whether the informing data received by the RF section 106 is a data destined to the portable wireless terminal device. When the informing data is destined to the portable wireless terminal device, the wireless interface unit CPU 105 transmits an acknowledge ACK to the wireless data supplying source 108 through the RF section 106. Subsequently, the wireless interface unit CPU 105 issues a data transmission stop request to the wireless data supplying source 108. The wireless data supplying source 108 stops the transmission of the valid data in response to the data transmission stop request. Further, the CPU 105 starts the timer section 111 such that the timer section 111 counts a predetermined time period and then generates an interrupt to the CPU 105.

In a step S202, the wireless interface unit CPU 105 drives the power supply control circuit 110 to wake up the serial communication unit 104. As a result, the serial communication unit 104 is set to the operating state. The wireless interface unit CPU 105 reads dummy data from a memory (not shown) and transmits the dummy data as a data reception request to the information processing unit 103 through the serial communication unit 104 via the serial data reception line and the terminals SOUT and RXD.

The section 102-1 of the serial communication unit 102 receives the data reception request so that the whole of serial communication unit 102 is turned on, i.e., is switched to the operating state. The serial communication unit 102 issues a wake up signal to the CPU driving circuit 109 to switch the CPU 101 from the non-operating state to the operating state. When the CPU 101 is set to the operating state, the serial communication unit 102 transmits the dummy data to the CPU 101. When detecting the dummy data immediately after the CPU 101 is set to the operating state, the CPU 101 neglects the dummy data.

In a step S203, the wireless interface unit CPU 105 waits for the interrupt from the timer section 111.

In a step S204, the wireless interface unit CPU 105 stops the transmission of the dummy data to the information processing unit 103 in response to the interrupt from the timer section 111. Also, the wireless interface unit CPU 105 issues a data transmission restart request to the wireless data supplying source 108 through the RF section 106 in response to the interrupt from the timer section 111. The wireless data supplying source 108 restarts the transmission of the valid data to the portable wireless terminal device in response to the data transmission restart request. The wireless interface unit CPU 105 receives the valid data through the RF section 106 and transmits the received valid data to the information processing unit CPU 101 through the serial communication units 104 and 105. The CPU 101 stores the valid data in the memory (not shown) or processes the valid data to store the processed data in the memory.

It should be noted that when it is determined in the step S201 that the informing data is not the data destined to the portable wireless terminal device, the wireless interface unit CPU 105 neglects the informing data.

In the first embodiment, a CPU needs a predetermined time period to be switched from the non-operating state to the operating state. Since the data reception request is issued when the information processing unit CPU 101 is in the non-operating state, there is a case where the serial valid data can not be correctly received by the information processing unit CPU 101. That is, it takes a time period in order for the CPU to be switched from the non-operating state such as a power off state or an operation stopped state to the operating state. This is especially true in a CPU which has an oscillation circuit and a frequency dividing circuit in the inside, the time period is from tens of milliseconds to about hundreds of milliseconds. Correct data transmission cannot be performed during this time period. For instance, in serial communication of 9600 bps, leading 960-bit data of the transmitted 9600-bit data is lost, if the communication can not be performed for 100 milliseconds.

Therefore, in order to switch the information processing unit CPU 101 to the operating state, the data reception request is issued from the wireless interface unit 107 to the information processing unit 103, when the informing data is received from wireless data supplying source 108.

Figure 3:
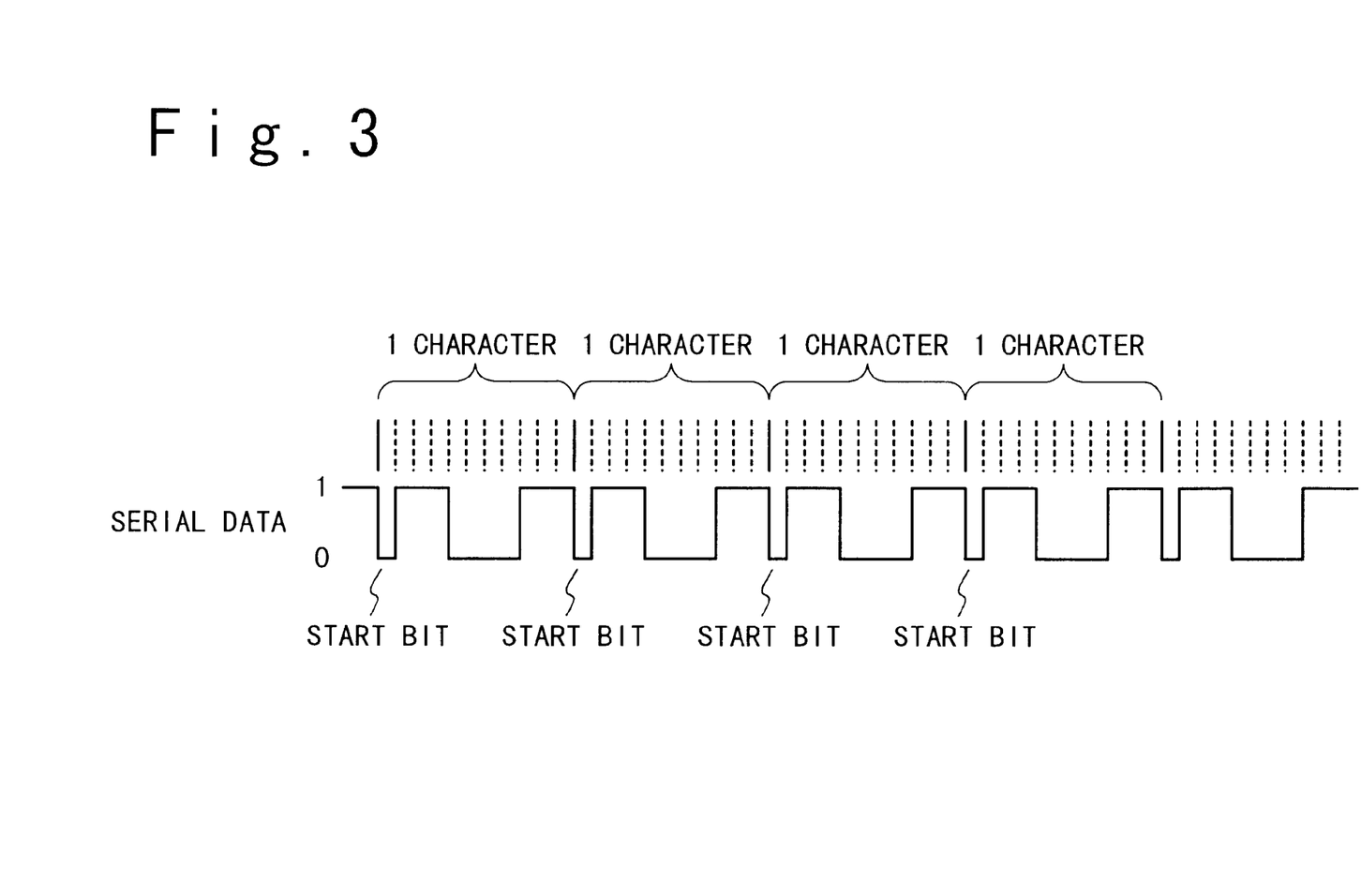
FIG. 3 is a diagram illustrating an example of a serial bit pattern used in the portable wireless terminal device in the first embodiment.
Figure 4:
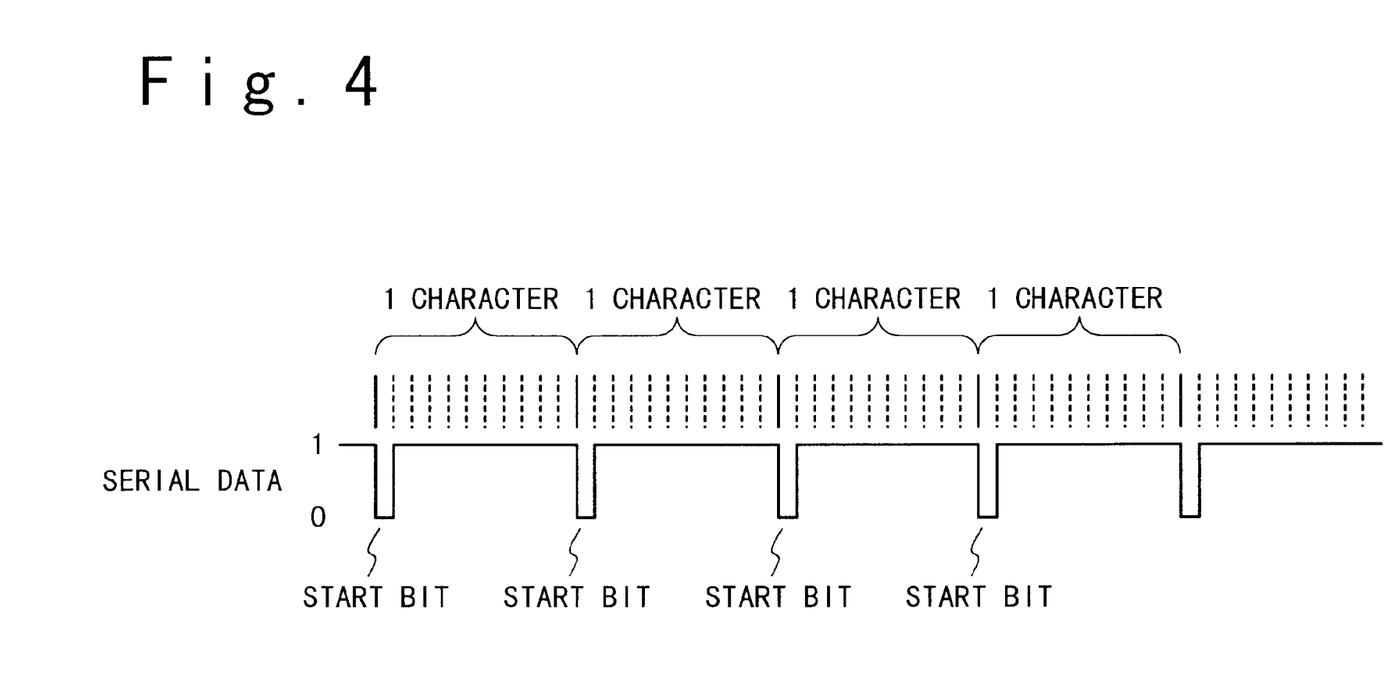
FIG. 4 is a diagram illustrating another example of a serial bit pattern used in the portable wireless terminal device in the first embodiment.

Next, the dummy data will be described. FIGS. 3 and 4 shows examples of the dummy data. As seen from FIGS. 3 and 4, a character data having a bit pattern is repeated many times to form the dummy data. Therefore, the CPU 101 can easily detect that the transmitted data is the dummy data. When it is assumed that each character data of the serial dummy data has the start bit of 0 as shown in FIG. 4 and the dummy data is transmitted, the information processing unit CPU 101 can easily find the start bit. Thus, the CPU 101 can be set to the state in which the valid data can be received.

Also, in case of the dummy data having the bit pattern shown in FIG. 3, there is a possibility for the CPU 101 to fail to receive the start bit of the first data. However, in any case, because the transmitted data is dummy data, there is no problem. That is, any bit pattern can be used. The dummy data shown in FIGS. 3 and 4 are examples of the dummy data and the dummy data may have any bit pattern. The time period of the timer section 111 is determined based on the CPU 101 in the information processing unit 103.

Next, the portable wireless terminal device according to the second embodiment of the present invention will be described. The portable wireless terminal device of the second embodiment has the same structure as that in the first embodiment. However, the CPU 101 issues an acknowledge ACK to the wireless interface section 107 when the CPU 101 is switched from the non-operating state to the operating state.

Figure 5:
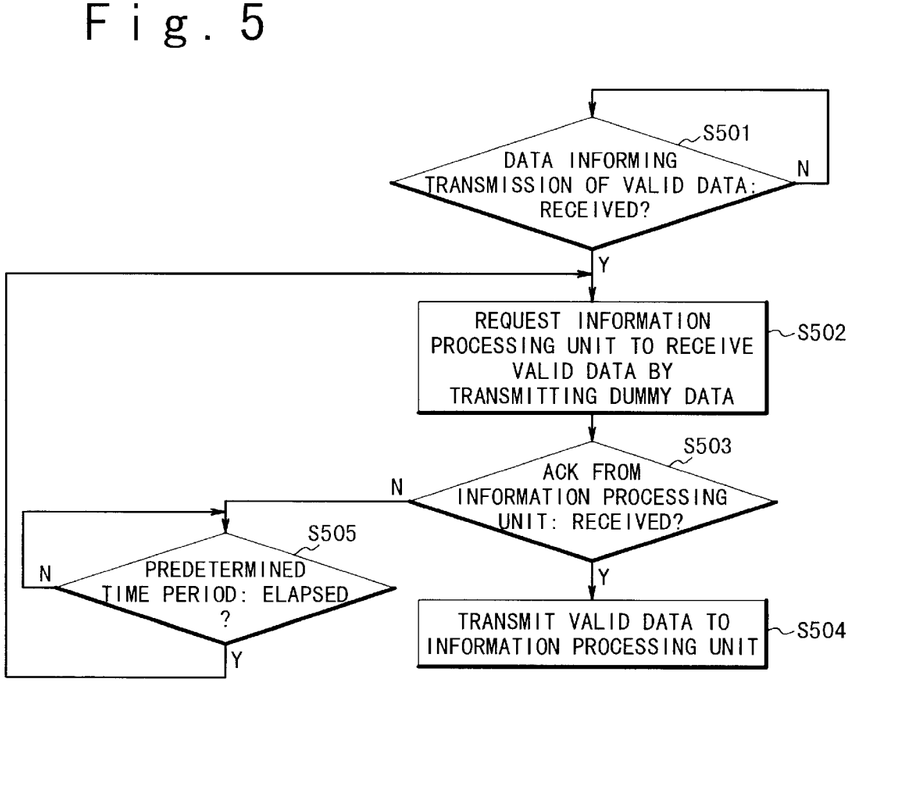
FIG. 5 is a flow chart to explain the operation of the portable wireless terminal device according to a second embodiment of the present invention.

Next, the operation of the portable wireless terminal device in the second embodiment will be described. FIG. 5 is the flow chart to explain the operation of the portable wireless terminal device in the second embodiment.

In a step S501, the wireless interface unit 107 is in the data wait state. When the data informing transmission of valid data is received by the RF section 106, the CPU 105 of the wireless interface unit 107 checks whether the informing data received by the RF section 106 is transmitted from the wireless data supplying source 108. Subsequently, when it is determined that the informing data is transmitted from the wireless data supplying source 108, the wireless interface unit CPU 105 checks whether the informing data received by the RF section 106 is a data destined to the portable wireless terminal device. When the informing data is destined to the portable wireless terminal equipment, the wireless interface unit CPU 105 transmits an acknowledge ACK to the wireless data supplying source 108 through the RF section 106. Subsequently, the wireless interface unit CPU 105 issues a data transmission stop request to the wireless data supplying source 108. The wireless data supplying source 108 stops the transmission of the valid data in response to the data transmission stop request. Further, the CPU 105 starts the timer section 111 such that the timer section 111 counts a predetermined time period and then generates an interrupt to the CPU 105.

In a step S502, the wireless interface unit CPU 105 drives the power supply control circuit 110 to wake up the serial communication unit 104. As a result, the serial communication unit 104 is set to the operating state. The wireless interface unit CPU 105 reads dummy data from a memory (not shown) and transmits the dummy data as a data reception request to the information processing unit 103 through the serial communication unit 104 via the serial data reception line and the terminals SOUT and RXD.

The section 102-1 of the serial communication unit 102 receives the data reception request so that the whole of serial communication unit 102 is turned on, i.e., is switched to the operating state. The serial communication unit 102 issues a wake up signal to the CPU driving circuit 109 to switch the CPU 101 from the non-operating state to the operating state. When the CPU 101 is set to the operating state, the serial communication unit 102 transmits the dummy data to the CPU 101. When detecting the dummy data immediately after the CPU 101 is set to the operating state, the CPU 101 neglects the dummy data. At that time, the CPU 101 issues an acknowledge ACK to the wireless interface unit 107 through the serial communication unit 102 via the serial transmission path and the terminals TXD and SIN.

In a step S503, the wireless interface unit CPU 105 waits for the acknowledge ACK from the CPU 101.

In a step S504, the wireless interface unit CPU 105 stops the transmission of the dummy data to the information processing unit 103 in response to the acknowledge ACK from the CPU 101. Also, the wireless interface unit CPU 105 issues a data transmission restart request to the wireless data supplying source 108 through the RF section 106 in response to the acknowledge ACK from the CPU 101. The wireless data supplying source 108 restarts the transmission of the valid data to the portable wireless terminal device in response to the data transmission restart request. The wireless interface unit CPU 105 receives the valid data through the RF section 106 and transmits the received valid data to the information processing unit CPU 101 through the serial communication units 104 and 102 via the serial transmission path and terminals RXD and SOUT. The CPU 101 stores the valid data in the memory (not shown) or processes the valid data to store the processed data in the memory.

In a step S503, when the wireless interface unit CPU 105 receives the interrupt from the timer section 111 while waiting for the acknowledge ACK from the CPU 101, the step S502 is performed again.

In this way, the information processing unit CPU 101 can receive the valid data which has been transmitted from the wireless interface unit CPU 105 after returning the acknowledge ACK.

Figure 6:
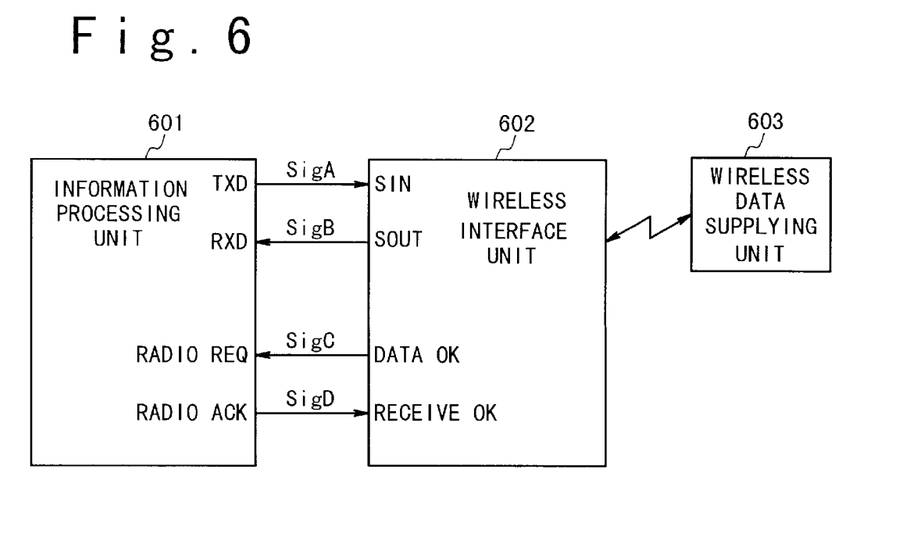
FIG. 6 is a block diagram illustrating the structure of the portable wireless terminal device according to a third embodiment of the present invention.

Next, the portable wireless terminal device according to the third embodiment of the present invention will be described. FIG. 6 is a block diagram illustrating the structure of the portable wireless terminal device according to the third embodiment of the present invention.

In the portable wireless terminal device in the third embodiment, in order to realize serial data communication, an information processing unit 601 has terminals RadioReq and RadioAck which are used to indicate whether serial communication of the valid data is possible, in addition to above-mentioned terminals TXD and RXD. Similarly, the wireless interface unit 602 has terminals corresponding to the terminals of the information processing unit 601. That is, the wireless interface unit 602 has the terminals SIN and SOUT which are respectively connected to the terminals TXD and RXD, and terminals DataOk and ReceiveOk which are respectively connected to the terminals RadioReq and RadioAck in the information processing unit 601.

Figure 7:
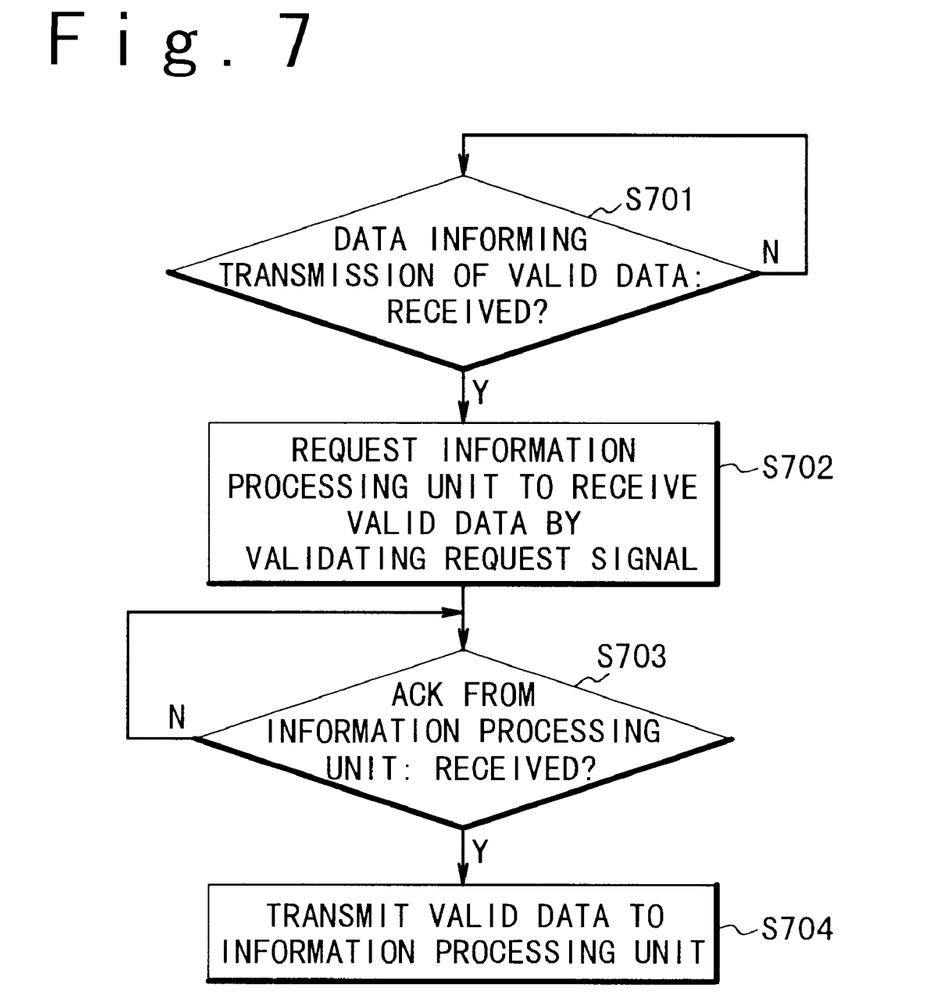
FIG. 7 is a flow chart to explain the operation of the portable wireless terminal device according to the third embodiment of the present invention.

Next, the operation of the portable wireless terminal equipment will be described. FIG. 7 is a flow chart to explain the operation of the portable wireless terminal equipment in the third embodiment.

The flow of the basic data in the third embodiment is the same as those in the first and the second embodiments. Therefore, a brief description will be given. The point that the operation in the third embodiment is different from those of the other embodiments is the data reception request to the information processing unit 601 is not the serial dummy data and it is realized by validating a request signal.

The initial state of the portable wireless terminal device is the same as in the first embodiment, and the wireless interface unit 602 is in the data wait state (Step 701).

When a data informing transmission of valid data is received, the wireless interface unit 602 checks whether the informing data received from a wireless data supplying source 603 is the data destined to the portable wireless terminal equipment.

When the informing data is determined to be destined to the portable wireless terminal equipment, the wireless interface unit 602 issues a data transmission stop request to the wireless data supplying source 603. The wireless data supplying source 603 stops the supply of the valid data in response to the data transmission stop request. Also, the wireless interface unit 602 issues a data reception request to the information processing unit 601 (Step 702). This is realized by validating a signal C from the terminal DataOk, as shown in FIG. 8C. The information processing unit 601 receives this signal at the terminal RAdioReq. In response to this signal C from the terminal RadioReq, a CPU (not shown) is switched from the non-operating state to the operating state. After the CPU in the information processing unit 601 is switched to the operating state, the information processing unit 601 validates a signal D from the terminal RadioAck to the wireless interface unit 602 to reply that the data reception is ready, as shown in FIG. 8D.

When the wireless interface unit 602 receives the signal D from the terminal ReceiveOk (step 703), the wireless interface unit 602 issues a data transmission restart request to the wireless data supplying source 603. In response to the data transmission restart request, the wireless data supplying source 603 restarts the transmission of the valid data to the portable wireless terminal device.

Figure 8A:
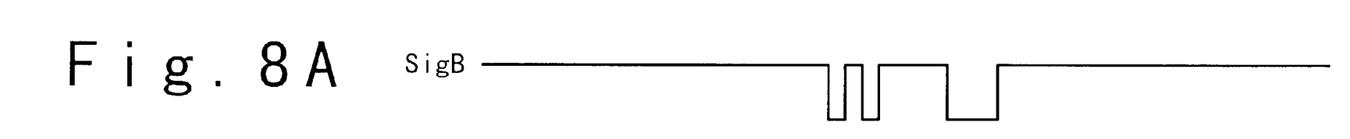
FIGS. 8A to 8D are timing charts to explain an example of a data communication process in the portable wireless terminal device in the third embodiment.
Figure 8B:
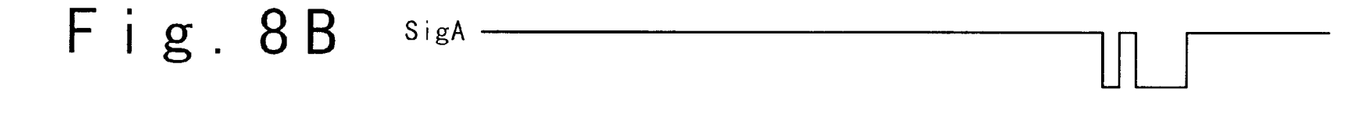
Figure 8C:
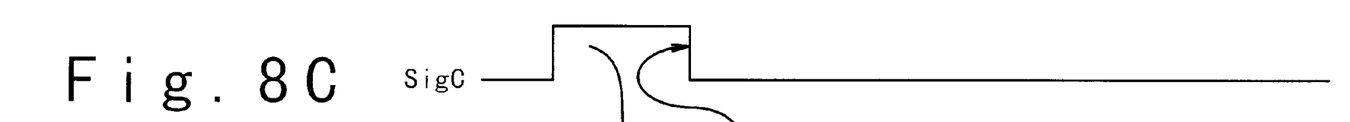
Figure 8D:
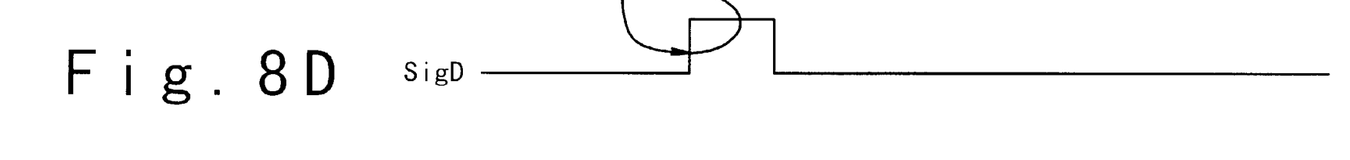

The wireless interface unit 602 transmits the valid data which is received from the wireless data supplying source 603, to the information processing unit 601 as the signal B (Step 704), as shown in FIG. 8A. Because the CPU in the information processing unit 601 is in the operating state, the wireless data can be received. The information processing unit 601 issues a signal A from the terminal TXD to the wireless interface unit 602 as an acknowledgment when receiving the valid data, as shown in FIG. 8B.

In this way, the valid data can be transferred from the wireless data supplying source 603 to the information processing unit 601 through the wireless interface unit 602.

As described above, according to the present invention, the wireless interface unit transmits dummy data having a predetermined bit pattern before the valid data is transmitted. After the CPU in the information processing unit is switched from the non-operating state to the operating state in response to the dummy data, the wireless interface unit transmits the valid data to the information processing unit CPU. As such, the information processing unit CPU can reliably receive the valid data.

It should be noted that the wireless data supplying source 108 and the wireless interface unit 107 communicate using electromagnetic waves such as an FM wave and an AM wave. However, they may communicate using light such as infrared rays.

What is claimed is:

1. A receiver comprising:
   a first processor including a CPU which switches between a non-operating state and an operating state; and
   a second processor which:
   (a) transmits, upon receipt of valid data from a data source, dummy data to said first processor to switch said CPU of said first processor from said non-operating state to said operating state;
   (b) causes said data source to cease transmission of said valid data while said CPU of said first processor switches from said non-operating state to said operating state and then to restart transmission of said valid data when said CPU is in said operating state; and thereafter
   (c) transmits said valid data to said first processor while said CPU of said first processor is in said operating state.

2. A receiver according to claim 1, wherein said dummy data is transmitted serially.

3. A receiver according to claim 1, wherein said dummy data consists of a plurality of data pieces each having the same bit pattern.

4. A receiver according to claim 1, wherein said dummy data is repeated until said CPU of said first processor is switched to said operating state.

5. A receiver according to claim 1, wherein said second processor transmits said valid data to said first processor after a predetermined time period from when said dummy data is transmitted to said first processor.

6. A receiver according to claim 5, wherein said predetermined time period is longer than a time period measured from when said dummy data is transmitted to said first processor to when said CPU of said first processor is switched to said operating state.

7. A receiver according to claim 5, wherein said second processor stops the transmission of said dummy data to said first processor after the passing of said predetermined time period from when said dummy data is transmitted to said first processor.

8. A receiver according to claim 5, wherein said second processor requests said data source to stop transmission of said valid data to said second processor when said second processor receives informing data indicating the beginning of transmission of said valid data to said second processor, said second processor further transmits said dummy data to said first processor in response to the reception of the informing data.

9. A receiver according to claim 8, wherein said second processor requests said data source to restart the transmission of said valid data to said second processor after said predetermined time period has passed from when said dummy data is transmitted to said first processor.

10. A receiver according to claim 1, wherein:
    said first processor sends a reply to said second processor when said dummy data is received,
    said CPU of said first processor is switched from said non-operating state to said operating state when said dummy data is received, and
    said second processor transmits said valid data to said first processor in response to said reply from said first processor.

11. A receiver according to claim 10, wherein said second processor stops said transmission of said dummy data to said first processor in response to said reply from said first processor.

12. A receiver according to claim 10, wherein said second processor requests said data source to stop transmission of said valid data to said second processor when said second processor receives informing data indicating the beginning of transmission of said valid data to said second processor, said second processor further transmits said dummy data to said first processor in response to the reception of said informing data.

13. A receiver according to claim 12, wherein said second processor requests said data source to restart the transmission of said valid data to said second processor in response to said reply from said first processor.

14. A receiver according to claim 10, wherein said second processor transmits said dummy data to said first processor via a first serial line, and
    wherein said first processor transmits said reply to said second processor via a second serial line.

15. A receiver according to claim 14, wherein said second processor transmits said valid data to said first processor via a third serial line.

16. The receiver as claimed in claim 1 wherein:
    said first processor is an information processing unit; and
    said second processor is an interface unit.

17. The receiver as claimed in claim 1 wherein said data source is a remote data source.

18. A method of processing data in a receiver having a first processor including a CPU which switches between an operating state and a non-operating state, and a second processor which receives valid data from an external unit, said method comprising:
    receiving, by said second processor, a data transmission of said valid data;

controlling, upon receipt of said informing transmission, said external unit to temporarily cease transmitting said valid data;

transmitting dummy data from said second processor to said first processor in response to said second processor receiving said valid data;

switching said CPU from said non-operating state to said operating state in response to reception of said dummy data;

controlling said external unit to restart transmitting data after said CPU is in said operating state;

transmitting said valid data from said second processor to said first processor while said CPU of said first processor is in said operating state; and processing said valid data by said CPU.

19. A method according to claim 18, wherein said step of transmitting said valid data includes:

waiting a predetermined time period; and transmitting said valid data from said second processor to said first processor after said predetermined time period has passed from when said dummy data is transmitted to said first processor.

20. A method according to claim 19, wherein said step transmitting said valid data includes requesting said external unit to restart the transmission of said valid data to said second processor after said predetermined time period has passed.

21. A method according to claim 18, wherein said step of transmitting said valid data includes:

sending a reply from said first processor to said second processor when said dummy data is received;

requesting said external unit to restart the transmission of said valid data to said second processor in response to said reply from said first processor; and transmitting said valid data to said first processor in response to said reply from said first processor.

22. A method according to claim 18, wherein said step of transmitting said valid data includes:

stopping the transmission of said dummy data before starting the transmission of said valid data.

23. The method as claimed in claim 18 wherein:

said first processor is an information processing unit; and said second processor is an interface unit.

24. The method as claimed in claim 18 wherein said steps of transmitting are performed serially.

25. The method as claimed in claim 18 wherein said external unit is a remote data source.

26. A receiver comprising:

a first processor including a CPU which switches between a non-operating state and an operating state; and second processor which:

transmits, upon receipt of valid data from a data source, dummy data to said first processor to switch said CPU of said first processor from said non-operating state to said operating state; and transmits said valid data to said first processor while said CPU of said first processor is in said operating state, wherein said dummy data consists of a plurality of data pieces each having the same bit pattern.

27. A receiver comprising:

a first processor including a CPU which switches between a non-operating state and an operating state; and a second processor which:

transmits, upon receipt of valid data from a data source, dummy data to said first processor to switch said CPU of said first processor from said non-operating state to said operating state; and transmits said valid data to said first processor while said CPU of said first processor is in said operating state, wherein said dummy data is repeated until said CPU of said first processor is switched to said operating state.

28. A receiver comprising:

a first processor including a CPU which switches between a non-operating state and an operating state; and a second processor which:

transmits, upon receipt of valid data from a data source, dummy data to said first processor for a predetermined time period, said dummy data being effective to switch said CPU of said first processor from said non-operating state to said operating state; and transmits said valid data to said first processor while said CPU of said first processor is in said operating state.

29. A receiver according to claim 28, wherein said predetermined time period is longer than a time period measured from when said dummy data is transmitted to said first processor to when said CPU of said first processor is switched to said operating state.

30. A receiver according to claim 28, wherein said second processor stops the transmission of said dummy data to said first processor after the passing of said predetermined time period from when said dummy data is transmitted to said first processor.

31. A receiver according to claim 28, wherein said second processor requests said data source to stop transmission of said valid data to said second processor when said second processor receives informing data indicating the beginning of transmission of said valid data to said second processor, said second processor further transmits said dummy data to said first processor in response to the reception of said informing data.

32. A receiver according to claim 31, wherein said second processor requests said data source to restart the transmission of said valid data to said second processor after said predetermined time period has passed from when said dummy data is transmitted to said first processor.

33. A receiver comprising:

a first processor including a CPU which switches between a non-operating state and an operating state; and a second processor which:

transmits, upon receipt of valid data from a data source, dummy data to said first processor to switch said CPU of said first processor from said non-operating state to said operating state; and transmits said valid data to said first processor while said CPU of said first processor is in said operating state wherein said first processor sends a reply to said second processor when said dummy data is received, said CPU of said first processor is switched from said non-operating state to said operating state when said dummy data is received, and said second processor transmits said valid data to said first processor in response to said reply from said first processor.

34. A receiver according to claim 33, wherein said second processor stops said transmission of said dummy data to said first processor in response to said reply from said first processor.

35. A receiver according to claim 33, wherein said second processor requests said data source to stop transmission of said valid data to said second processor when said second processor receives informing data indicating the beginning of transmission of said valid data to said second processor, said interface unit further transmits said dummy data to said first processor in response to the reception of said informing data.

36. A receiver according to claim 35, wherein said second processor requests said data source to restart the transmission of said valid data to said second processor in response to said reply from said first processor.

37. A receiver according to claim 33, wherein said second processor transmits said dummy data to said first processor via a first serial line, and wherein said first processor transmits said reply to said second processor via a second serial line.

38. A receiver according to claim 37, wherein said second processor transmits said valid data to said first processor via a third serial line.

39. A method of processing data in a receiver having a first processor including a CPU which switches between an operating state and a non-operating state, and a second processor which receives valid data from an external unit, said method comprising:

receiving, by said second processor, a data transmission of said valid data;

transmitting dummy data from said second processor to said first processor in response to said second processor receiving said valid data;

switching said CPU from said non-operating state to said operating state in response to reception of said dummy data;

waiting a predetermined time period;

transmitting said valid data from said second processor to said first processor after said predetermined time period has passed from when said dummy data is transmitted to said first processor, and while said CPU of said first processor is in said operating state; and processing said valid data by said CPU.

40. A method according to claim 39, wherein said step of receiving a data transmission of said valid data includes: requesting said external unit to stop the transmission of said valid data to said interface unit, and wherein said step of transmitting said valid data includes requesting said external unit to restart the transmission of said valid data to said second processor after said predetermined time period has passed.

41. A method of processing data in a receiver having a first processor including a CPU which switches between an operating state and a non-operating state, and a second processor which receives valid data from an external unit, said method comprising:

receiving, by said second processor, a data transmission of said valid data;

requesting said external unit to stop the transmission of said valid data to said interface unit;

transmitting dummy data from said second processor to said first processor in response to said second processor receiving said valid data;

sending a reply from said first processor to said second processor when said dummy data is received;

switching said CPU from said non-operating state to said operating state in response to reception of said dummy data;

requesting said external unit to restart the transmission of said valid data to said second processor in response to said reply from said first processor; and transmitting said valid data from said second processor to said first processor while said CPU of said first processor is in said operating state and in response to said reply from said first processor; and processing said valid data by said CPU.

42. A method of processing data in a receiver having a first processor including a CPU which switches between an operating state and a non-operating state, and a second processor which receives valid data from an external unit, said method comprising:

receiving, by said second processor, a data transmission of said valid data;

transmitting dummy data from said second processor to said first processor in response to said second processor receiving said valid data;

switching said CPU from said non-operating state to said operating state in response to reception of said dummy data;

stopping the transmission of said dummy data before the transmission of said valid data;

transmitting said valid data from said second processor to said first processor while said CPU of said first processor is in said operating state; and processing said valid data by said CPU.

* * * * *